US010707752B1

(12) United States Patent
Yu

(10) Patent No.: US 10,707,752 B1
(45) Date of Patent: Jul. 7, 2020

(54) POWER GENERATING SYSTEM

(71) Applicant: ACTRON TECHNOLOGY CORPORATION, Taoyuan (TW)

(72) Inventor: Chia-Sung Yu, Taoyuan (TW)

(73) Assignee: ACTRON TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 16/658,166

(22) Filed: Oct. 21, 2019

(30) Foreign Application Priority Data

Aug. 14, 2019 (TW) .............................. 108128901 A

(51) Int. Cl.
*H02M 3/00* (2006.01)
*H02M 3/07* (2006.01)
*G06F 1/30* (2006.01)
*H02M 3/158* (2006.01)
*H01F 30/14* (2006.01)
*H02M 7/06* (2006.01)

(52) U.S. Cl.
CPC ................ *H02M 3/07* (2013.01); *G06F 1/30* (2013.01); *H01F 30/14* (2013.01); *H02M 3/158* (2013.01); *H02M 7/06* (2013.01)

(58) Field of Classification Search
CPC .......... H02M 3/07; H02M 7/06; H02M 3/158; G06F 1/30; H01F 30/14
See application file for complete search history.

(56) References Cited

U.S. PATENT DOCUMENTS

| 5,499,178 A | 3/1996 | Mohan | |
|---|---|---|---|
| 5,730,094 A * | 3/1998 | Morris | B60W 10/06 123/192.1 |
| 2009/0302678 A1* | 12/2009 | Kokubun | H02P 9/02 307/9.1 |
| 2011/0050136 A1* | 3/2011 | Sumi | B60L 3/04 318/400.3 |
| 2018/0175762 A1* | 6/2018 | Yu | H02P 6/17 |

OTHER PUBLICATIONS

"Office Action of Taiwan Counterpart Application", dated Feb. 25, 2020, p. 1-p. 4.

* cited by examiner

Primary Examiner — Adolf D Berhane
Assistant Examiner — Afework S Demisse
(74) Attorney, Agent, or Firm — JCIPRNET

(57) ABSTRACT

A power generating system including a stator, a neutral line, a rectifier circuit and a power conversion circuit is provided. The stator has a plurality of phase coils configured to provide an AC power. The neutral line is coupled to a common point of the phase coils. The rectifier circuit is coupled between the phase coils and a power bus and is configured to convert the AC power to provide a DC power to the power bus. The power conversion circuit is coupled between the neutral line and the power bus, and is controlled by a control signal to convert a power of the neutral line and thereby provide a compensation power to the power bus to stabilize a voltage of the power bus. Alternatively, the power conversion circuit is controlled by the control signal to recuperate a power passing through a part of the rectifier circuit to the stator.

10 Claims, 5 Drawing Sheets

POWER GENERATING SYSTEM

CROSS-REFERENCE TO RELATED APPLICATION

This application claims the priority benefit of Taiwan application serial no. 108128901, filed on Aug. 14, 2019. The entirety of the above-mentioned patent application is hereby incorporated by reference herein and made a part of this specification.

BACKGROUND OF THE INVENTION

Field of the Invention

The disclosure relates to a power generating technology, and particularly relates to a power generating system with high efficiency and an energy recuperation mechanism.

Description of Related Art

A conventional generator is composed of components such as a rotor coil, a stator coil and a rectifier circuit, wherein the rotor coil and the stator coil of the generator can synergistically operate to convert mechanical energy to AC power, and the rectifier circuit can convert the AC power to DC power to power a load or charge a battery. Furthermore, a conventional motor is composed of components such as the rotor coil, the stator coil and a driving circuit, wherein the driving circuit can convert the DC power provided by the generator or the battery to the AC power, and the rotor coil and the stator coil of the motor can synergistically operate to convert the AC power to the mechanical energy. Furthermore, when the motor is braked, the rotor coil and the stator coil of the motor can synergistically operate to convert the mechanical energy to the AC power, and the AC power is converted to the DC power by the rectifier circuit to be recharged back to the battery.

In general, in the stator coil, because the number of turns, wire diameter, phase angle and power factor of each phase coil are different, the phase coils cannot ideally reach phase equilibrium. Taking three phase coils as an example, the sum of the third, sixth and ninth sub-harmonic currents of the three-phase harmonic current synthesizes a neutral line current at a neutral line, thereby affecting the output power of the generator or affecting the power recharged back to the battery when the motor is braked. In order to increase the power provided by the generator or to increase the power recharged back to the battery when the motor is braked, the power of the neutral line of the generator or the motor is usually provided to an output end of the generator through a rectifier diode. However, as the voltage at the output end of the generator is already rippled, if the power of the neutral line is further provided to the output end of the generator by the rectifier diode, the voltage ripple at the output end of the generator will become larger, and the excessive voltage ripple not only causes the problem of electromagnetic interference (EMI), but also affects the charging efficiency of the battery and the operation of the load.

Furthermore, when the load at the output end of the generator changes drastically or is removed, the power in the generator is usually not vented, resulting in an overshoot phenomenon of the voltage at the output end of the generator, and the overshot output voltage is likely to cause damage to elements inside the generator or other loads at the output end.

SUMMARY OF THE INVENTION

Based on the above, the invention provides a power generating system which can not only reduce the ripple of the output voltage while increasing the output power, but also suppress the overshoot phenomenon of the output voltage when the load of the power generating system changes or is removed.

The power generating system provided by the invention includes a stator, a neutral line, a rectifier circuit and a power conversion circuit. The stator has a plurality of phase coils. The phase coils are configured to provide an AC power and have a common point. The neutral line is coupled to the common point of the phase coils. The rectifier circuit is coupled between the phase coils and a power bus and is configured to convert the AC power to provide a DC power to the power bus. The power conversion circuit is coupled between the neutral line and the power bus. The power conversion circuit is controlled by a control signal to convert a power of the neutral line and thereby provide a compensation power to the power bus to stabilize a voltage of the power bus. Alternatively, the power conversion circuit is controlled by the control signal to recuperate a power passing through a part of the rectifier circuit to the stator.

In an embodiment of the invention, the power generating system further includes a control circuit. The control circuit is coupled to the power bus and the power conversion circuit and is configured to generate the control signal according to the voltage of the power bus.

In an embodiment of the invention, when the voltage of the power bus is greater than a threshold voltage, the control circuit generates the control signal to enable the power conversion circuit, so that the power passing through the part of the rectifier circuit is recuperated to the stator through the power conversion circuit and the neutral line to suppress the voltage of the power bus to be less than the threshold voltage, wherein the power passing through the part of the rectifier circuit is a pulsating DC power after half-wave rectification.

In an embodiment of the invention, when the voltage of the power bus is less than the threshold voltage, the control circuit generates the control signal to control turn-on and turn-off of the power conversion circuit, so that the power conversion circuit provides the compensation power to the power bus to maintain the voltage of the power bus within a reference voltage range.

In an embodiment of the invention, when the voltage of the power bus is less than the threshold voltage, the power conversion circuit performs voltage conversion on the power of the neutral line in response to the control signal to generate the compensation power.

In an embodiment of the invention, when the voltage of the power bus is less than the threshold voltage, the power conversion circuit modulates a current value and a current phase of the neutral line in response to the control signal.

In an embodiment of the invention, the stator is a stator of a vehicle motor.

In an embodiment of the invention, when the vehicle motor is braked, the power conversion circuit is controlled by the control signal to convert the power of the neutral line and thereby provide the compensation power to the power bus.

In an embodiment of the invention, the stator is a stator of an AC generator, and the DC power is provided to a battery or a load of the power generating system.

In an embodiment of the invention, the power conversion circuit is a DC to DC converter or an AC to DC converter.

Based on the above, in the power generating system provided by the embodiment of the invention, the power conversion circuit can be controlled by the control signal to convert the power of the neutral line to the compensation power and provide the compensation power to the power bus so as to increase the output power of the power bus and stabilize the voltage of the power bus. Alternatively, the power conversion circuit can be controlled by the control signal to recuperate the power passing through a part of the rectifier circuit to the stator to suppress the overshoot phenomenon of the voltage of the power bus.

In order to make the aforementioned and other objectives and advantages of the invention comprehensible, embodiments accompanied with figures are described in detail below.

BRIEF DESCRIPTION OF THE DRAWINGS

The accompanying drawings below are a part of this specification of the invention, and illustrate exemplary embodiments of the invention. The accompanying drawings, together with the description of the specification, serve to describe the principles of the invention.

DESCRIPTION OF THE EMBODIMENTS

Figure 1:
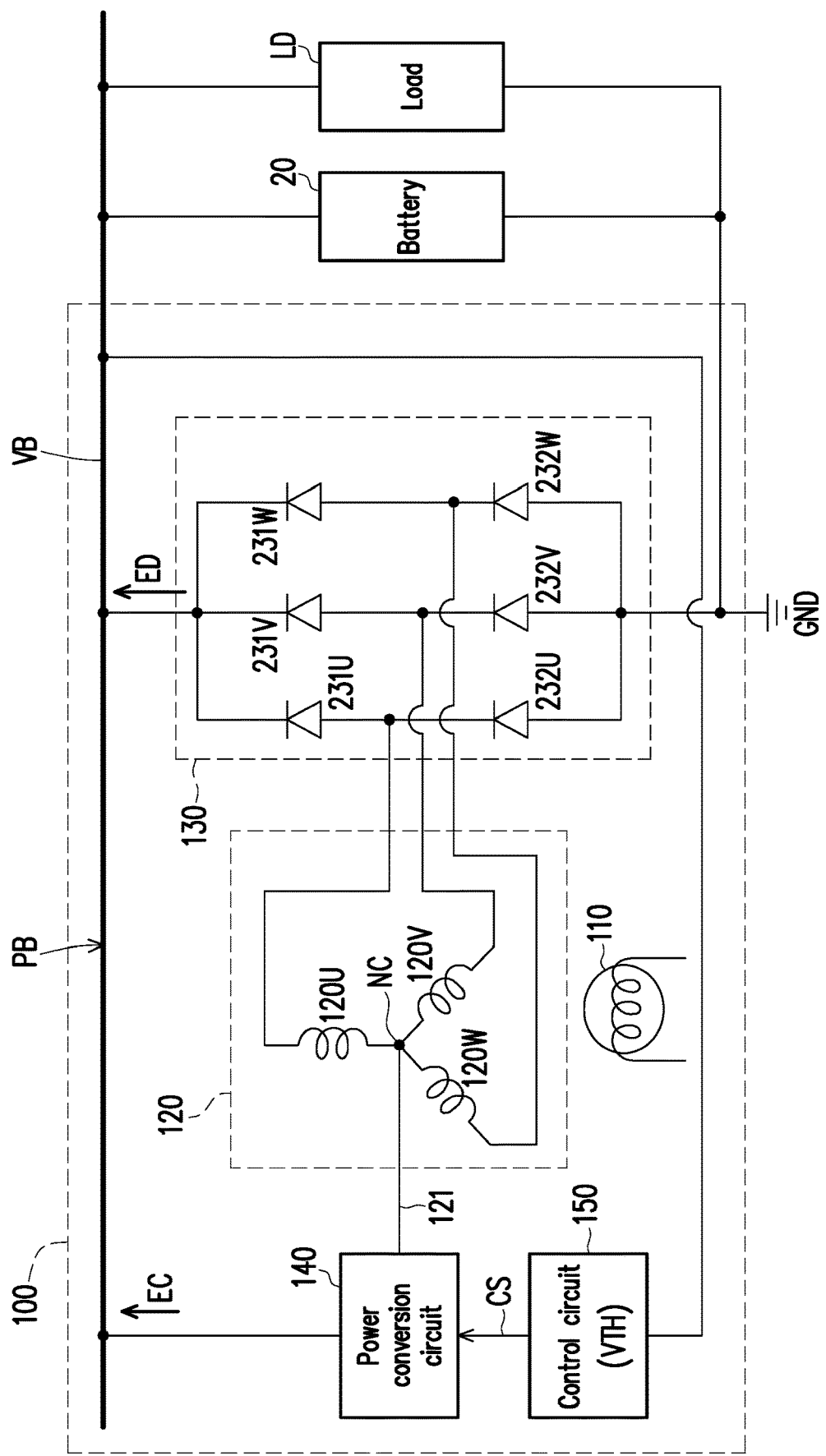
FIG. 1 is a schematic block diagram of a power generating system according to an embodiment of the invention.

In order to make the content of the invention more comprehensible, embodiments are described below as examples of implementation of the invention. Wherever possible, the same reference numbers are used in the drawings and the description to refer to the same or like parts, components or steps.

Referring to FIG. 1, FIG. 1 is a schematic block diagram of a power generating system 100 according to an embodiment of the invention. The power generating system 100 may include a rotor 110, a stator 120, a neutral line 121, a rectifier circuit 130 and a power conversion circuit 140, but the invention is not limited thereto. The rotor 110 and the stator 120 can synergistically operate to convert the mechanical energy to the AC power. The stator 120 has a plurality of phase coils. The invention does not limit the number of phase coils (namely the number of phases) of the stator 120. However, for convenience of explanation, the following embodiments will be described with the number of phases of the stator 120 being three, and embodiments with the number of phases of the stator 120 being other numbers can be derived from the following description. Based on the above, the stator 120 has three phase coils 120U, 120V and 120W. The three phase coils 120U, 120V and 120W can provide AC power, wherein the first end of the phase coil 120U, the first end of the phase coil 120V and the first end of the phase coil 120W are coupled to a common point NC to form an inverted Y-shaped coil structure as shown in FIG. 1. Furthermore, the neutral line 121 is also coupled to the common point NC of the three phase coils 120U, 120V and 120W.

The rectifier circuit 130 is coupled between the three phase coils 120U, 120V and 120W and a power bus PB, and is used for converting the AC power to DC power ED, and providing the DC power ED to the power bus PB to power a load LD and charge a battery 20.

In an embodiment of the invention, the rectifier circuit 130 can include a U-phase upper diode 231U, a U-phase lower diode 232U, a V-phase upper diode 231V, a V-phase lower diode 232V, a W-phase upper diode 231W and a W-phase lower diode 232W. The negative poles of the U-phase upper diode 231U, the V-phase upper diode 231V and the W-phase upper diode 231W are jointly coupled to the power bus PB. The positive poles of the U-phase lower diode 232U, the V-phase lower diode 232V and the W-phase lower diode 232W are jointly coupled to a grounding end GND. The positive pole of the U-phase upper diode 231U and the negative pole of the U-phase lower diode 232U are jointly coupled to the second end of the phase coil 120U. The positive pole of the V-phase upper diode 231V and the negative pole of the V-phase lower diode 232V are jointly coupled to the second end of the phase coil 120V. The positive pole of the W-phase upper diode 231W and the negative pole of the W-phase lower diode 232W are jointly coupled to the second end of the phase coil 120W.

It is noted that the diodes described above and shown in the drawings are only an example of the rectifier circuit 130, and the invention is not limited thereto. In another embodiment of the invention, the rectifier circuit 130 can also be implemented by adopting a synchronous or active rectifier circuit, such as a rectifier switch.

The power conversion circuit 140 is coupled between the neutral line 121 and the power bus PB. Specifically, the power conversion circuit 140 can be controlled by a control signal CS to convert the power of the neutral line 121 and thereby provide a compensation power EC to the power bus PB so as to stabilize the voltage VB (namely output voltage) of the power bus PB. Alternatively, the power conversion circuit 140 can be controlled by the control signal CS to recuperate the power passing through a part of the rectifier circuit 130 to the stator 120.

Because the power conversion circuit 140 can provide the compensation power EC to the power bus PB, the output power of the power bus PB can be increased. Furthermore, the compensation power EC converted by the power conversion circuit 140 can stabilize the voltage VB of the power bus PB, thereby effectively reducing the ripple of the voltage VB. In addition, when the load LD coupled to the power bus PB changes or is removed (for example, when the state of the load LD changes from a heavy load to a light load or no load), the power conversion circuit 140 can be controlled by the control signal CS to recuperate the power passing through a part of the rectifier circuit 130 to the stator 120 so as to suppress the overshoot phenomenon of the voltage VB.

In an embodiment of the invention, the power passing through a part of the rectifier circuit 130 is pulsating DC power after half-wave rectification.

In an embodiment of the invention, the rotor 110 and the stator 120 can be, for example, a rotor and a stator of an AC generator, and the DC power ED is provided to the battery 20 or the load LD of the power generating system 100, but the invention is not limited thereto.

In another embodiment of the invention, the rotor 110 and the stator 120 can be, for example, a rotor and a stator of a vehicle motor. When the vehicle motor is braked, the vehicle motor is operated in a power generating mode, so that the rotor 110 and the stator 120 can synergistically operate to convert the mechanical energy of the motor to the AC power, and the rectifier circuit 130 can convert the AC power to the DC power ED and provide the DC power ED to the power bus PB. Furthermore, when the vehicle motor is braked, the power conversion circuit 140 can be controlled by the control signal CS to convert the power of the neutral line 121 and thereby provide the compensation power EC to the power bus PB.

In an embodiment of the invention, the power conversion circuit 140 can be an existing DC to DC converter or an existing AC to DC converter, wherein the DC to DC converter can be, for example, a step-up DC to DC converter, a step-down DC to DC converter or a step-up and step-down general-purpose DC to DC converter, but the invention is not limited thereto.

In an embodiment of the invention, the power generating system 100 can further include a control circuit 150. The control circuit 150 is coupled to the power bus PB and the power conversion circuit 140 and generates the control signal CS according to the voltage VB of the power bus PB to control the operation of the power conversion circuit 140, but the invention is not limited thereto. In other embodiments of the invention, the control circuit 150 may not be included inside the power generating system 100 and is a control chip independent of the power generating system 100.

In an embodiment of the invention, the control circuit 150 can be hardware, firmware or software or machine executable program codes stored in a memory and loaded and executed by a micro-processor or a micro-controller. If implemented by the hardware, the control circuit 150 can be implemented by a single integrated circuit chip, or can be implemented by a plurality of circuit chips. The plurality of circuit chips or the single integrated circuit chip can be implemented by adopting an application-specific integrated circuit (ASIC) or a field programmable gate array (FPGA). The above memory can be, for example, a random access memory, a read-only memory, a flash memory or the like.

Figure 2A:
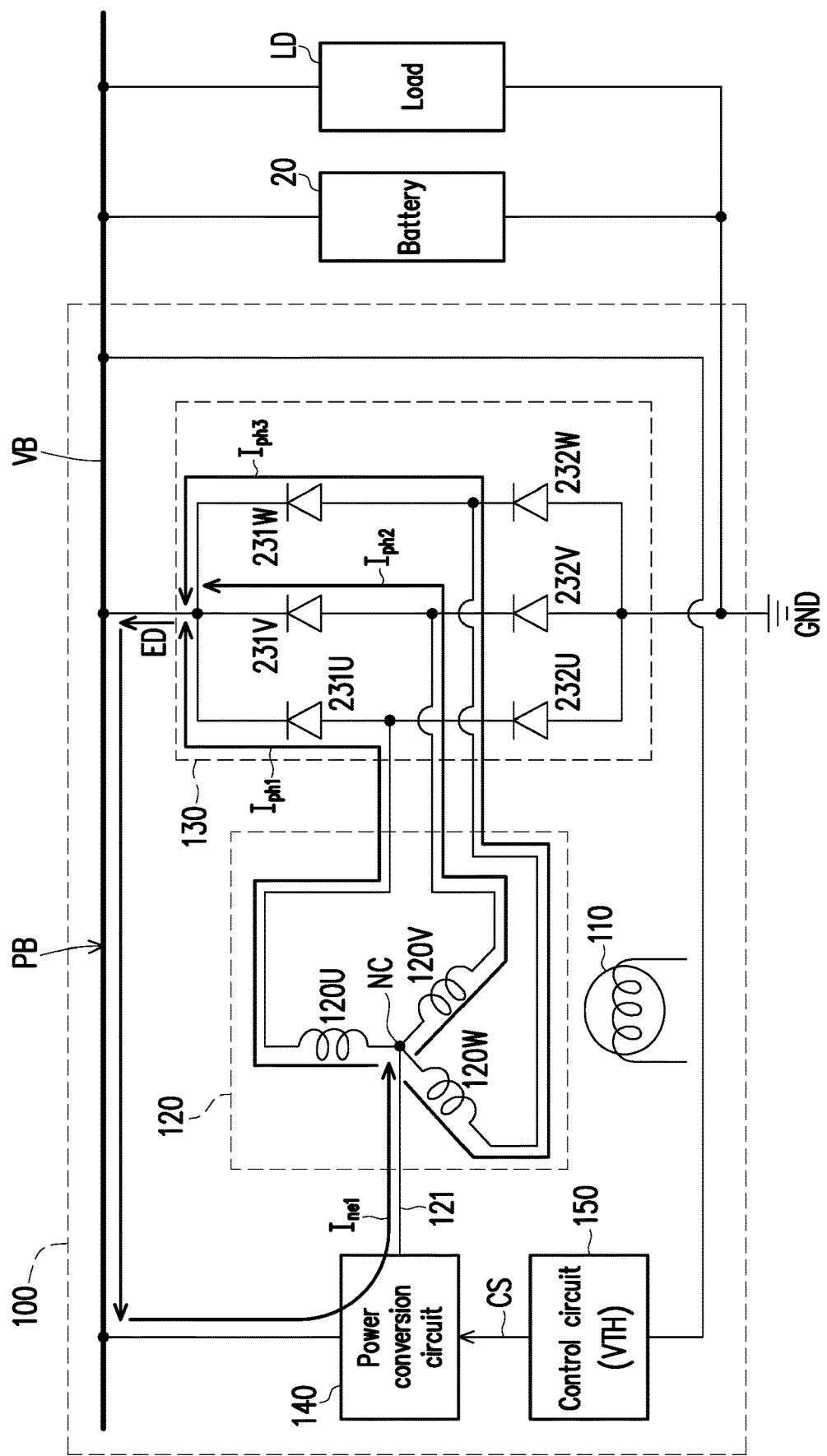
FIG. 2A is a schematic diagram of power distribution of the power generating system shown in FIG. 1 according to an embodiment of the invention.

In an embodiment of the invention, the control circuit 150 can be used for detecting the voltage VB of the power bus PB. When the state of the load LD changes from the heavy load to the light load or no load, the voltage VB of the power bus PB rises upward. When the voltage VB of the power bus PB is greater than a threshold voltage VTH, the control circuit 150 can generate the control signal CS to enable the power conversion circuit 140, so that the pulsating DC power passing through a part of the rectifier circuit 130 after the half-wave rectification can be recuperated to the stator 120 through the power conversion circuit 140 and the neutral line 121 to suppress the voltage VB of the power bus PB to be less than the threshold voltage VTH. As shown in FIG. 2A, when the pulsating DC power is recuperated to the stator 120, a current $I_{ne1}$ flows from the power bus PB to the neutral line 121 through the power conversion circuit, and the current $I_{ne1}$ flowing into the neutral line 121 is equal to the sum of currents $I_{ph1}$, $I_{ph2}$ and $I_{ph3}$ of the three phase coils 120U, 120V and 120W.

In an embodiment of the invention, when the voltage VB of the power bus PB is less than the threshold voltage VTH, the control circuit 150 can generate the control signal CS according to the voltage VB to control the turn-on and turn-off of the power conversion circuit 140, so that the power conversion circuit 140 provides the compensation power EC to the power bus PB to maintain the voltage VB of the power bus PB within a specific reference voltage range.

Figure 2B:
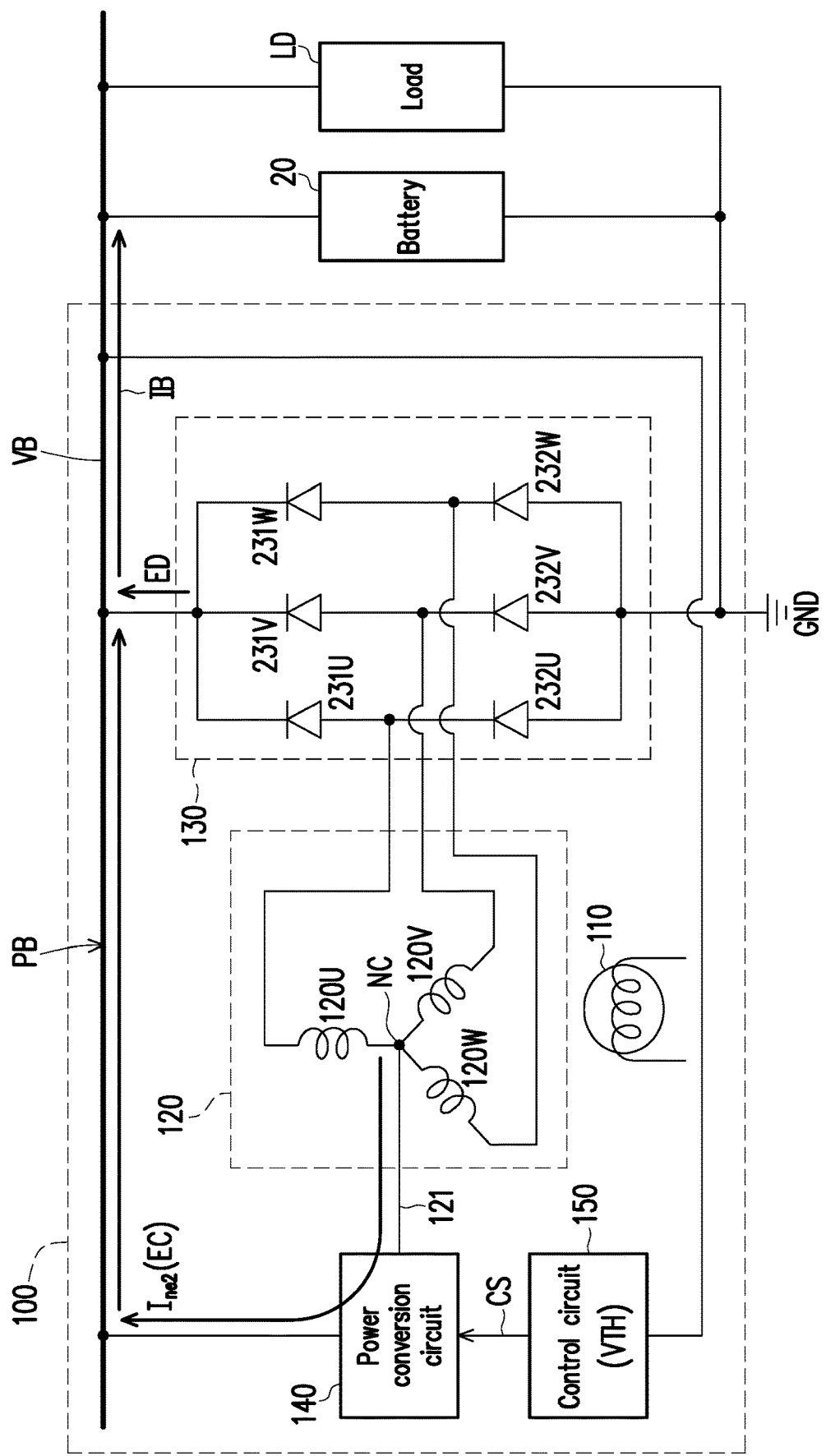
FIG. 2B is a schematic diagram of power distribution of the power generating system shown in FIG. 1 according to another embodiment of the invention.

Specifically speaking, when the voltage VB of the power bus PB is less than the threshold voltage VTH, the power conversion circuit 140 performs voltage (step-up or step-down) conversion on the power of the neutral line 121 in response to the control signal CS to generate and provide the compensation power EC to the power bus PB. Further, as shown in FIG. 2B, when the voltage VB of the power bus PB is less than the threshold voltage VTH, the power conversion circuit 140 modulates the current value and the current phase of the neutral line 121 in response to the control signal CS, and a modulated current $I_{ne2}$ of the neutral line 121 is output to the power bus PB to compensate for the voltage VB, thereby reducing the ripple of the voltage VB and maintaining the voltage VB within the specific reference voltage range. At this time, the DC power ED and the compensation power EC jointly power the load LD and charge the battery 20.

Figure 3:
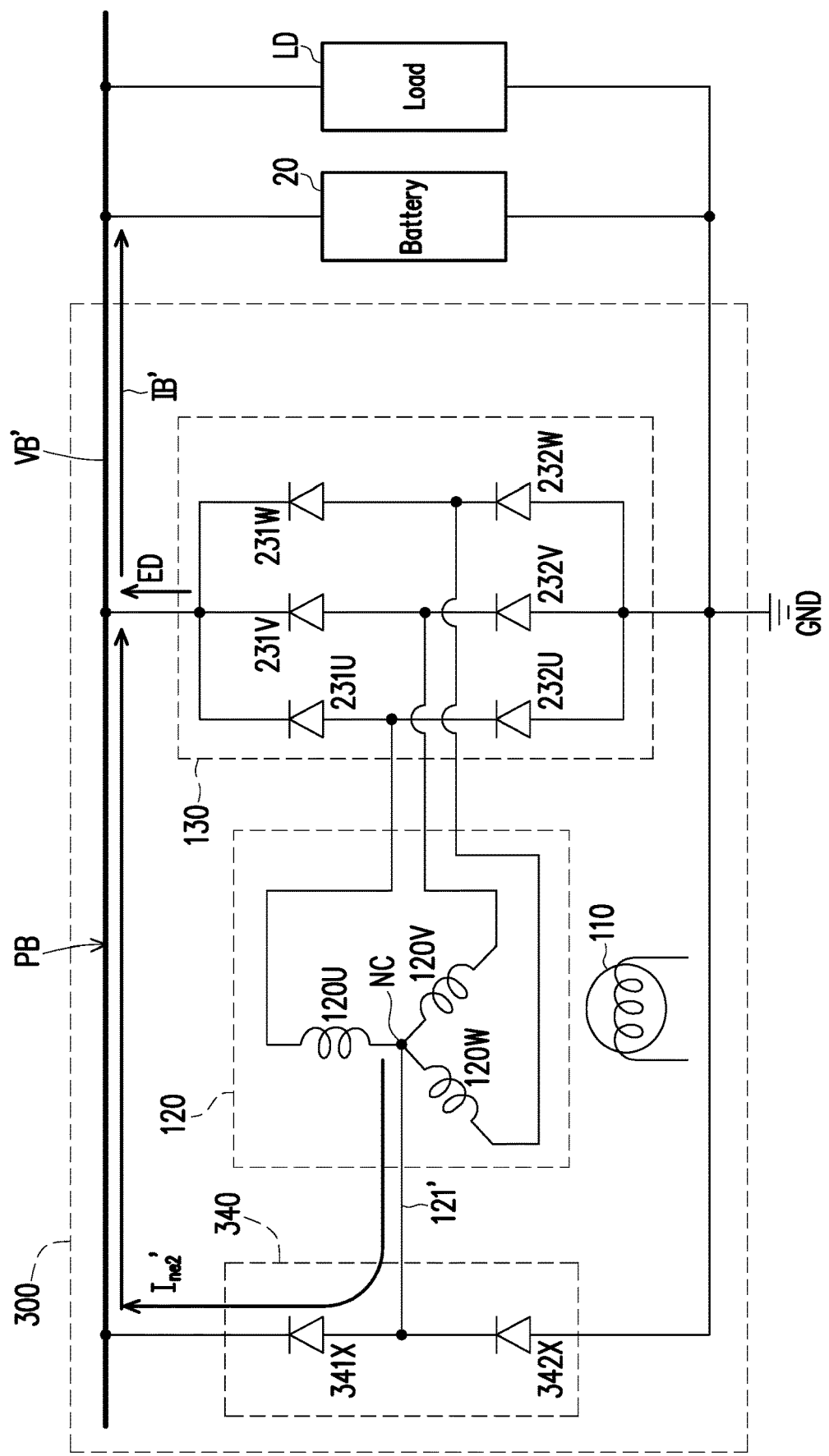
FIG. 3 is a schematic block diagram of the power generating system of which the current of the neutral line is not modulated.

Referring to FIG. 3 below, FIG. 3 is a schematic block diagram of a power generating system 300 of which the current of the neutral line is not modulated. The power generating system 300 includes a rotor 110, a stator 120 and rectifier circuits 130 and 340, wherein the rotor 110, the stator 120 and the rectifier circuit 130 of the power generating system 300 are respectively similar to the rotor 110, the stator 120 and the rectifier circuit 130 of the power generating system 100 in FIG. 1. Therefore, reference may be made to the above related descriptions for the details, and the descriptions thereof are omitted herein.

Compared with the neutral line 121 of the power generating system 100 in FIG. 1 coupled to the power conversion circuit 140, a neutral line 121' of the power generating system 300 in FIG. 3 is coupled to the rectifier circuit 340. Further, the rectifier circuit 340 includes an upper diode 341X and a lower diode 342X. The negative pole of the upper diode 341X is coupled to the power bus PB. The positive pole of the lower diode 342X is coupled to the grounding end GND. The positive pole of the upper diode 341X and the negative pole of the lower diode 342X are jointly coupled to the neutral line 121' of the power generating system 300.

It can be understood that the power of the neutral line 121' of the power generating system 300 can be provided to the power bus PB by the unidirectionally conducted upper diode 341X to increase the output power of the power generating system 300. However, because the current magnitude and current phase of the neutral line 121' of the power generating system 300 are not modulated, the ripple of the voltage VB' and the output current IB' of the power bus PB becomes larger. Furthermore, when the state of the load LD changes from a heavy load to a light load or no load, the voltage VB' of the power bus PB rises upward. Based on the unidirectional conduction characteristic of the upper diode 341X, the DC power ED of the power bus PB cannot be recuperated to the stator 120 by the upper diode 341X, so that the overshoot phenomenon of the voltage VB' cannot be suppressed.

Figure 4:
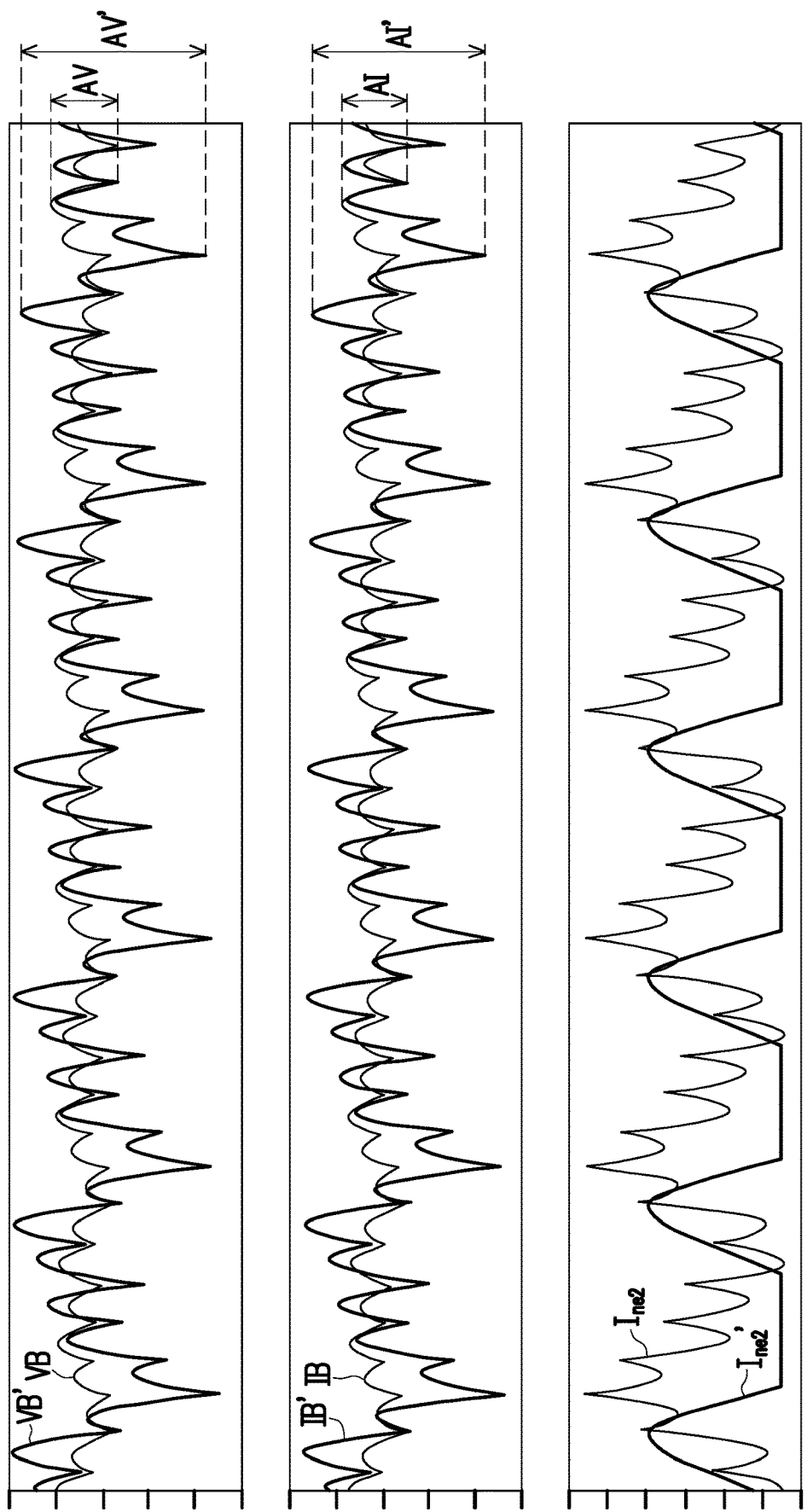
FIG. 4 shows schematic diagrams of signal waveforms of the voltage of a power bus, the output current of the power generating system and the current of the neutral line.

Referring to FIG. 2B, FIG. 3 and FIG. 4 together, FIG. 4 shows schematic diagrams of signal waveforms of the voltages VB and VB' of the power buses PB, the output currents IB and IB' and the currents $I_{ne2}$ and $I_{ne2}'$ of the neutral lines 121 and 121' in FIG. 2B and FIG. 3, wherein a horizontal axis represents time, and a vertical axis represents the voltage value or the current value. As can be seen from FIG. 4, the ripple amplitude AV of the voltage VB of the power generating system 100 is less than the ripple amplitude AV' of the voltage VB' of the power generating system 300, and the ripple amplitude AI of the output current IB of the power generating system 100 is less than the ripple amplitude AI' of the output current IB' of the power generating system 300. Therefore, the current $I_{ne2}$ (namely the modulated current) of the neutral line 121 of the power generating system 100 can effectively reduce the ripple of the voltage VB and the output current IB of the power bus PB of the power generating system 100.

Based on the foregoing, in the power generating system provided by the embodiment of the invention, the power conversion circuit can be controlled by the control signal to convert the power of the neutral line to the compensation power and provide the compensation power to the power bus so as to increase the output power of the power bus and stabilize the voltage of the power bus. Furthermore, when the load coupled to the power bus changes or is removed, the power conversion circuit can be controlled by the control signal to recuperate the power passing through a part of the rectifier circuit (such as the pulsating DC power after the half-wave rectification) to the stator so as to suppress the overshoot phenomenon of the voltage of the power bus.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A power generating system, comprising:
a stator, provided with a plurality of phase coils, wherein the phase coils are configured to provide an AC power and are provided with a common point;
a neutral line, coupled to the common point of the phase coils;
a rectifier circuit, coupled between the phase coils and a power bus and configured to convert the AC power to provide a DC power to the power bus; and
a power conversion circuit, coupled between the neutral line and the power bus, wherein the power conversion circuit is controlled by a control signal to convert a power of the neutral line and thereby provide a compensation power to the power bus to stabilize a voltage of the power bus, and alternatively, the power conversion circuit is controlled by the control signal to recuperate a power passing through a part of the rectifier circuit to the stator.

2. The power generating system according to claim 1, further comprising:
a control circuit, coupled to the power bus and the power conversion circuit and configured to generate the control signal according to the voltage of the power bus.

3. The power generating system according to claim 2, wherein when the voltage of the power bus is greater than a threshold voltage, the control circuit generates the control signal to enable the power conversion circuit, so that the power passing through the part of the rectifier circuit is recuperated to the stator through the power conversion circuit and the neutral line to suppress the voltage of the power bus to be less than the threshold voltage, wherein the power passing through the part of the rectifier circuit is a pulsating DC power after half-wave rectification.

4. The power generating system according to claim 2, wherein when the voltage of the power bus is less than a threshold voltage, the control circuit generates the control signal to control turn-on and turn-off of the power conversion circuit, so that the power conversion circuit provides the compensation power to the power bus to maintain the voltage of the power bus within a reference voltage range.

5. The power generating system according to claim 4, wherein when the voltage of the power bus is less than the threshold voltage, the power conversion circuit performs voltage conversion on the power of the neutral line in response to the control signal to generate the compensation power.

6. The power generating system according to claim 4, wherein when the voltage of the power bus is less than the threshold voltage, the power conversion circuit modulates a current value and a current phase of the neutral line in response to the control signal.

7. The power generating system according to claim 1, wherein the stator is a stator of a vehicle motor.

8. The power generating system according to claim 7, wherein when the vehicle motor is braked, the power conversion circuit is controlled by the control signal to convert the power of the neutral line and thereby provide the compensation power to the power bus.

9. The power generating system according to claim 1, wherein the stator is a stator of an AC generator, and the DC power is provided to a battery or a load of the power generating system.

10. The power generating system according to claim 1, wherein the power conversion circuit is a DC to DC converter or an AC to DC converter.

* * * * *